(12) United States Patent
Huang (10) Patent No.: US 10,288,757 B2
(45) Date of Patent: May 14, 2019

(54) ACOUSTO-ELECTROMAGNETIC APPARATUS AND METHOD FOR ACOUSTIC SENSING

(71) Applicant: Halliburton Energy Services, Inc., Houston, TX (US)

(72) Inventor: Wei Hsuan Huang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 25 days.

(21) Appl. No.: 15/113,185

(22) PCT Filed: Dec. 31, 2014

(86) PCT No.: PCT/US2014/072933
§ 371 (c)(1),
(2) Date: Jul. 21, 2016

(87) PCT Pub. No.: WO2016/108868
PCT Pub. Date: Jul. 7, 2016

(65) Prior Publication Data
US 2017/0010387 A1    Jan. 12, 2017

(51) Int. Cl.
*G01V 1/40* (2006.01)
*G01V 11/00* (2006.01)
*G01V 1/52* (2006.01)
*G01V 3/30* (2006.01)

(52) U.S. Cl.
CPC ............ *G01V 1/40* (2013.01); *G01V 1/52* (2013.01); *G01V 3/30* (2013.01); *G01V 11/00* (2013.01); *G01V 11/002* (2013.01)

(58) Field of Classification Search
CPC ..... G01V 1/40; G01V 1/44; G01V 1/52; G01V 3/30; G01V 11/00; G01V 11/002
See application file for complete search history.

(56) References Cited

U.S. PATENT DOCUMENTS

| 4,414,651 | A | * | 11/1983 | Buckner | ................ | G01V 1/48 367/27 |
| 9,766,363 | B2 | * | 9/2017 | Morys | ................ | G01V 3/30 |
| 2004/0196046 | A1 | | 10/2004 | Aidan | | |
| 2006/0238200 | A1 | | 10/2006 | Johnstad | | |
| 2008/0066962 | A1 | | 3/2008 | Rolovic et al. | | |

(Continued)

FOREIGN PATENT DOCUMENTS

| WO | WO-2014189497 A1 | 11/2014 |
| WO | WO-2014193382 A1 | 12/2014 |
| WO | WO-2016108868 A1 | 7/2016 |

OTHER PUBLICATIONS

"International Application Serial No. PCT/US2014/072933, International Search Report dated Sep. 1, 2015", 3 pgs.

(Continued)

*Primary Examiner* — Ian J Lobo
(74) *Attorney, Agent, or Firm* — Gilliam IP PLLC (57) ABSTRACT

In some embodiments, an apparatus, method, and a system may operate to include an AEM sensor configured to generate an electromagnetic wave into a geologic formation. The AEM sensor is further configured to receive a reflected electromagnetic wave from the formation. The reflected electromagnetic wave is representative of a velocity of an acoustic wave traveling through the geologic formation.

23 Claims, 9 Drawing Sheets

(56) References Cited

U.S. PATENT DOCUMENTS

| | | | | |
|---|---|---|---|---|
| 2008/0306692 A1* | 12/2008 | Singer | ............... | G01V 1/50 |
| | | | | 702/11 |
| 2009/0261832 A1* | 10/2009 | DePavia | ............... | G01V 1/42 |
| | | | | 324/338 |
| 2011/0251813 A1* | 10/2011 | Coman | ............... | G01V 11/002 |
| | | | | 702/89 |

OTHER PUBLICATIONS

"International Application Serial No. PCT/US2014/072933, Written Opinion dated Sep. 1, 2015", 11 pgs.

* cited by examiner

ACOUSTO-ELECTROMAGNETIC APPARATUS AND METHOD FOR ACOUSTIC SENSING

PRIORITY APPLICATION

This application is a U.S. National Stage Filing under 35 U.S.C. 371 from International Application No. PCT/US2014/072933, filed on Dec. 31, 2014 and published as WO 2016/108868 A1 on Jul. 7, 2016, which applications and publication are incorporated herein by reference in their entirety.

BACKGROUND

Understanding the structure and properties of geological formations may reduce the cost of drilling wells for oil and gas exploration. Measurements are typically performed in a borehole (i.e., down hole measurements) in order to attain this understanding. For example, the measurements may identify the composition and distribution of material that surrounds the measurement device down hole. To obtain such measurements, a variety of sensors and mounting configurations may be used. However, such sensors may be sensitive to acoustic noise and may not be able to detect various waves that do not propagate through fluids.

DETAILED DESCRIPTION

To address some of the challenges described above, as well as others, apparatus, systems, and methods are described herein that may operate to improve the detection of shear waves and increase the resolution of acoustic sensing in down hole applications.

Acoustic waves (e.g., sonic, seismic) may be detected by an acousto-electromagnetic (AEM) sensor for both relatively high frequency and relatively low frequency acoustic waves in measure while drilling (MWD)/logging while drilling (LWD) applications and wireline applications. Using the AEM sensor to detect the sonic waves provides a hybrid downhole tool that is capable of multiple applications including acoustic and seismic measurements. For MWD/LWD applications, the AEM sensor may combine both acoustic tools and seismic tools into a single tool. The tool can be used as a sonic tool during drilling and can be used as a seismic tool when drilling is halted and mud pump is off.

The AEM sensor operates by transmitting an electromagnetic (EM) wave, from an EM source (e.g., emitter), through a geologic formation to be reflected back to an EM receiver (e.g., sensor) by an acoustic wave in the formation. The received EM signal will have experienced a Doppler shift that is representative of the velocity of the acoustic wave. This velocity may be used to detect formation properties such as elasticity, viscosity, and/or density. The AEM sensor may also detect shear waves in a geologic formation even though shear waves do not propagate through fluids.

Due to an AEM sensor's insensitivity to acoustic noise, the high frequency nature of EM waves may result in high resolution acoustic sensing. Additionally, by varying the sampling rate of the EM emitter and receiver, relatively large frequency bands of acoustic waves may be detected.

Figure 1:
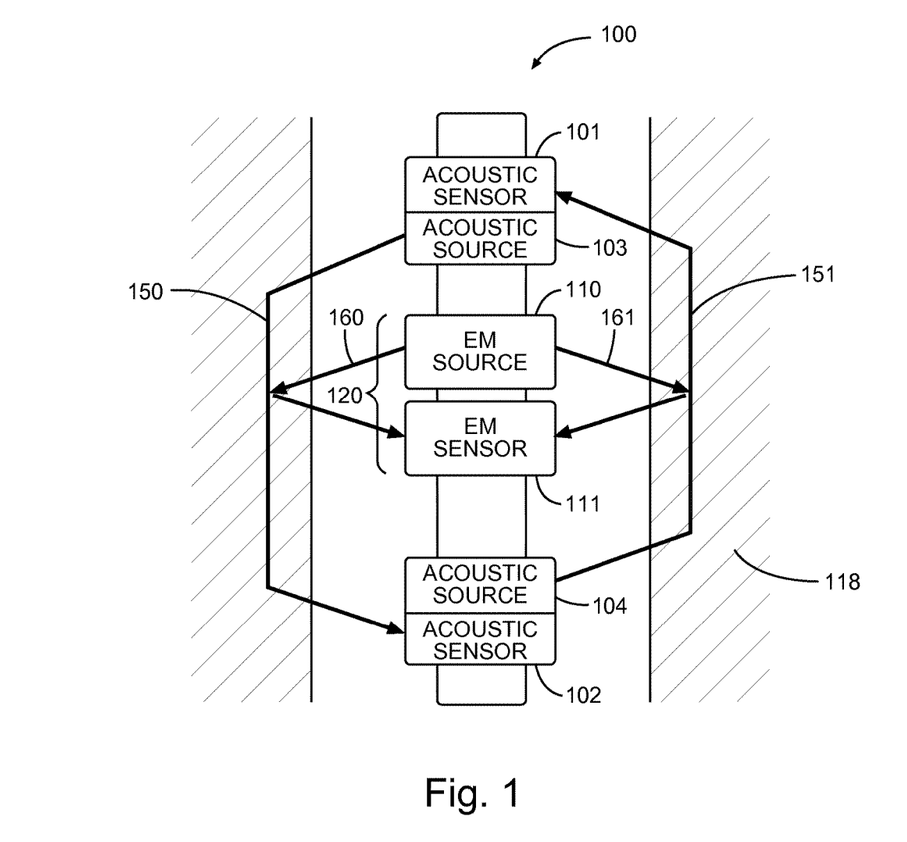
FIG. 1 is a block diagram showing an embodiment of an acousto-electromagnetic (AEM) apparatus used as a sonic tool.

FIG. 1 is a block diagram showing an embodiment of an AEM apparatus 100 that may be used as a sonic tool. In one or more embodiments, the AEM apparatus 100 may be used for acoustic wave detection while drilling. Thus, this embodiment may be part of a drillstring.

The AEM apparatus 100 includes acoustic sources 103, 104 and acoustic sensors 101, 102. Each acoustic source 103, 104 is paired with an associated acoustic sensor 101, 102 and the source/sensor pairs are located a fixed distance apart on the apparatus 100. The sources and/or sensors may be disposed on or in a tool body, e.g. a sonde, or as part of a drill string, e.g. a BHA.

An electromagnetic source (e.g., EM emitter) 110 and an EM sensor 111 may be located relatively close to the center of the AEM apparatus 100. The combination of the EM source 110 and the EM sensor 111 may be referred to as an AEM sensor 120.

In operation, each acoustic source 103, 104 may emit high frequency (e.g., >1 kHz) acoustic waves 150, 151 through the formation 118 at substantially the same time. The simultaneous emission on both ends of the apparatus 100 may be used to account for changes in borehole diameter.

The AEM sensor 120 may transmit EM energy (e.g., EM waves) 160, 161 from the EM source 110 through the formation 118. The EM sensor 111 may then detect the reflection of the EM waves from the formation 118. A measured Doppler shift effect may then be used to calculate the acoustic wave velocity. The Doppler shift effect may be measured by methods such as Fast Fourier Transform (FFT) or similar mathematical methods in transforming measured time domain information to its frequency domain information. Frequency domain information enables measurement of Doppler shift effect by measuring the change in frequency domain data. Thus, the AEM sensor 120 is able to detect the acoustic wave velocity directly. The Doppler shift may be determined by circuitry (e.g., controller, processor) communicably coupled to the EM sensor 111. The circuitry can be disposed at the surface (e.g., see FIGS. 7 and 8) or can be located in the tool and the Doppler shift transmitted as telemetry to the surface. The amount of Doppler shift may be representative of the velocity of the acoustic waves through the formation. This velocity may then be used in determining the properties of the formation as discussed previously.

As a quality check operation, the acoustic sensors 101, 102 may also receive the acoustic waves 150, 151. A difference in time may be determined between the time the acoustic waves 150, 151 were transmitted by the acoustic sources 103, 104 and the time the acoustic waves 150, 151 are received by the acoustic sensors 101, 102 after traveling through the formation 118. Since the distance between the two acoustic sources 103, 104 is known, the difference in time may be used to determine the velocity of the acoustic waves 150, 151 through the formation. The velocity determined by using the acoustic sensors may be compared to the velocity measured directly by the AEM sensor 120 to verify the accuracy of the AEM sensor measurement.

Figure 2:
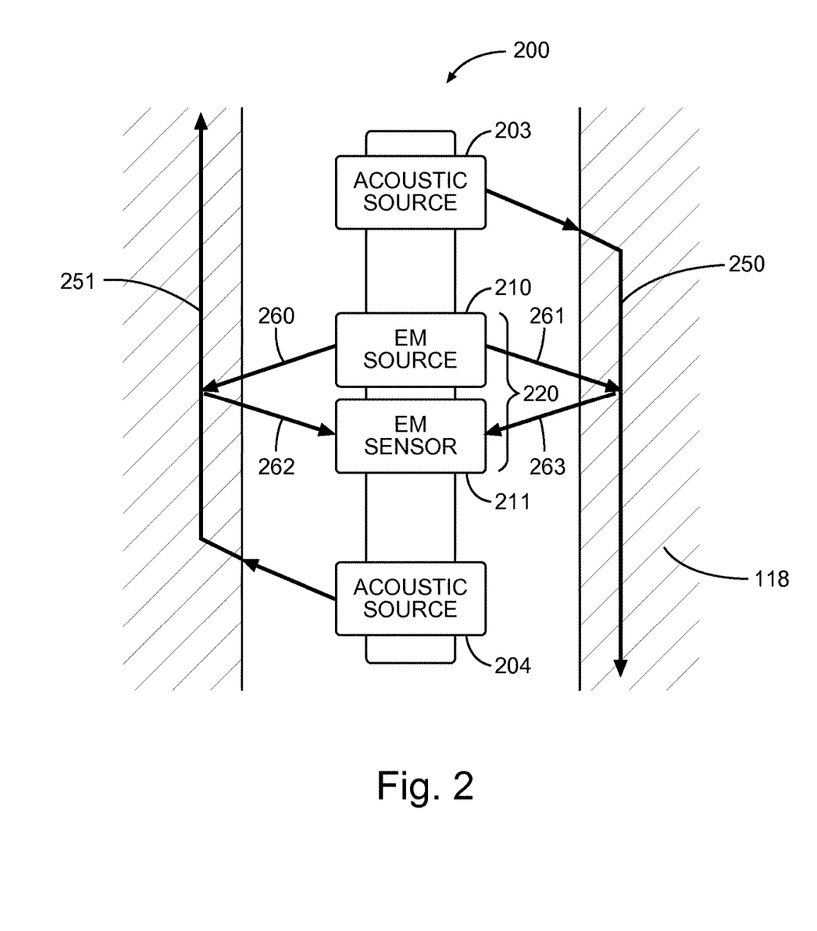
FIG. 2 is a block diagram showing another embodiment of an AEM apparatus used as a sonic tool.

FIG. 2 is a block diagram showing another embodiment of an AEM apparatus 200 that may be used as a sonic tool. The AEM apparatus 200 of FIG. 2 is substantially similar to the embodiment of FIG. 1 but does not include the acoustic sensors for the quality check operation. In one or more embodiments, the AEM apparatus 200 may be used for acoustic wave detection while drilling. Thus, this embodiment may be part of a drillstring.

The AEM apparatus 200 includes acoustic sources 203, 204 located a fixed distance apart on the apparatus 200. An electromagnetic source (e.g., EM emitter) 210 and an EM sensor 211 may be located relatively close to the center of the AEM apparatus 200. The combination of the EM source 210 and the EM sensor 211 may be referred to as an AEM sensor 220.

In operation, each acoustic source 203, 204 may emit high frequency (e.g., >1 kHz) acoustic waves 250, 251 through the formation 118 at substantially the same time. The simultaneous emission on both ends of the AEM apparatus 200 may be used to account for changes in borehole diameter.

The AEM sensor 220 may transmit EM energy (e.g., EM waves) 260, 261 from the EM source 210 through the formation 118. The EM sensor 211 may then detect the reflection 262, 263 of the EM waves from the formation 118. A measured Doppler shift effect may then be used to calculate the acoustic wave velocity. The Doppler shift may be determined by a circuitry (e.g., controller, processor) communicably coupled to the EM sensor 211. The circuitry can be disposed at the surface (e.g., see FIGS. 7 and 8) or can be located in the tool and the Doppler shift transmitted as telemetry to the surface. The amount of Doppler shift may be representative of the velocity of the acoustic waves through the formation 118. This velocity may then be used in determining the properties of the formation as discussed previously.

Figure 3:
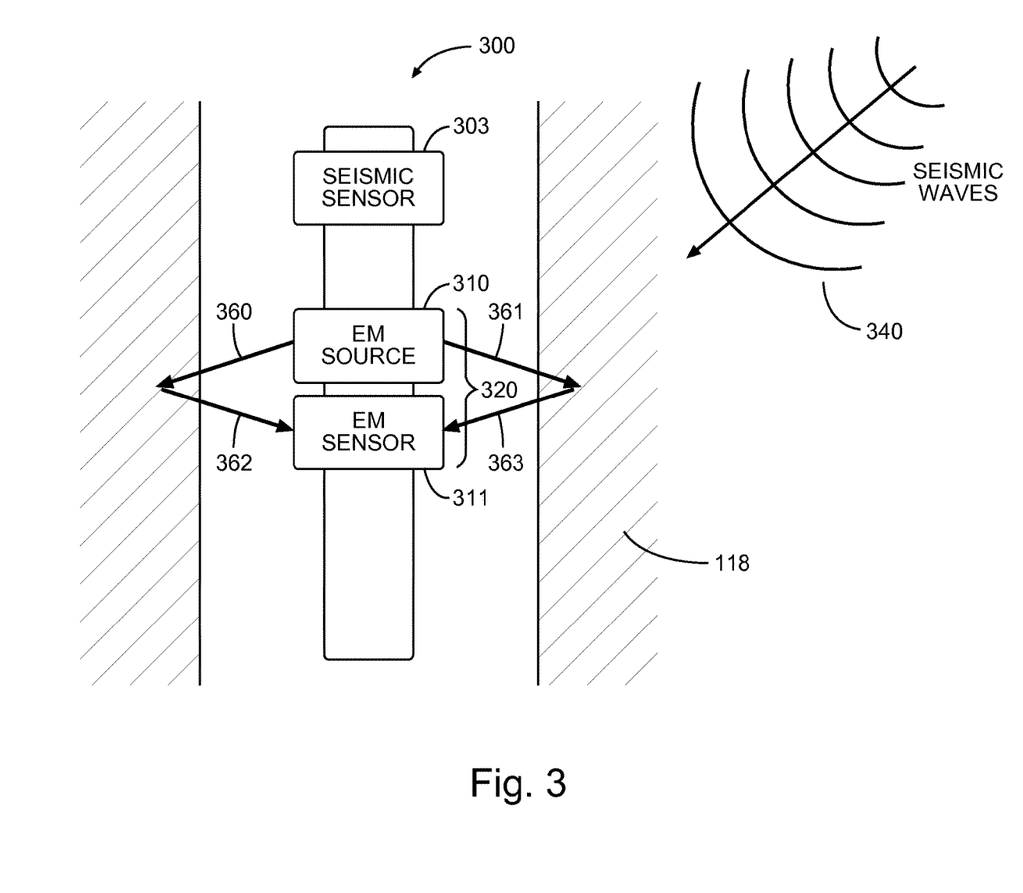
FIG. 3 is a block diagram showing an embodiment of an AEM apparatus used as a seismic tool.

FIG. 3 is a block diagram showing another embodiment of an AEM apparatus 300 used as a seismic tool. The AEM apparatus 300 may be used as a seismic tool while sources of noise (e.g., pumps, drilling) are removed. Thus, this embodiment may be used in a wireline logging tool or in the drillstring while the drilling operation has been halted.

Figure 7:
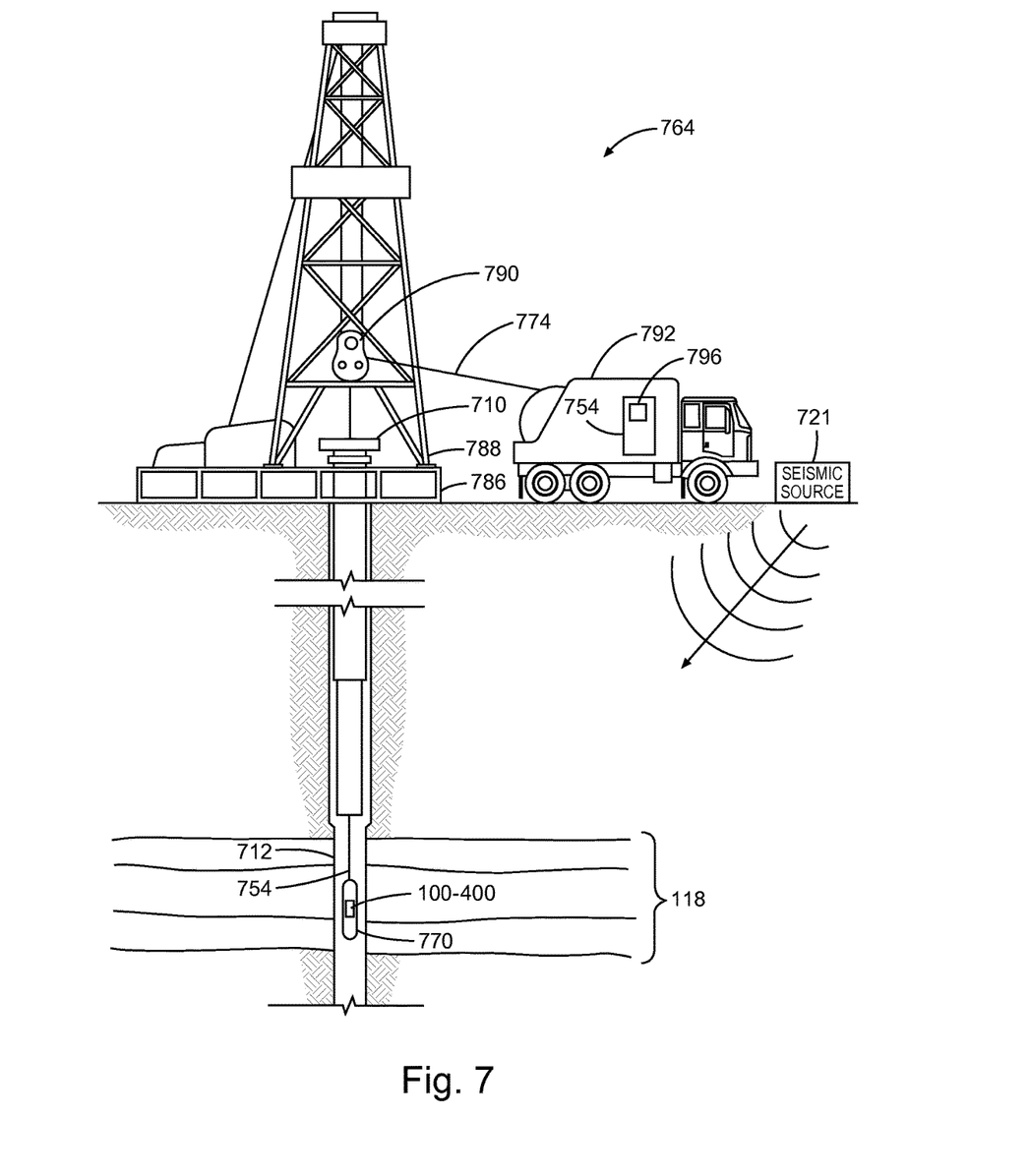
FIG. 7 is a diagram of a wireline system embodiment.
Figure 8:
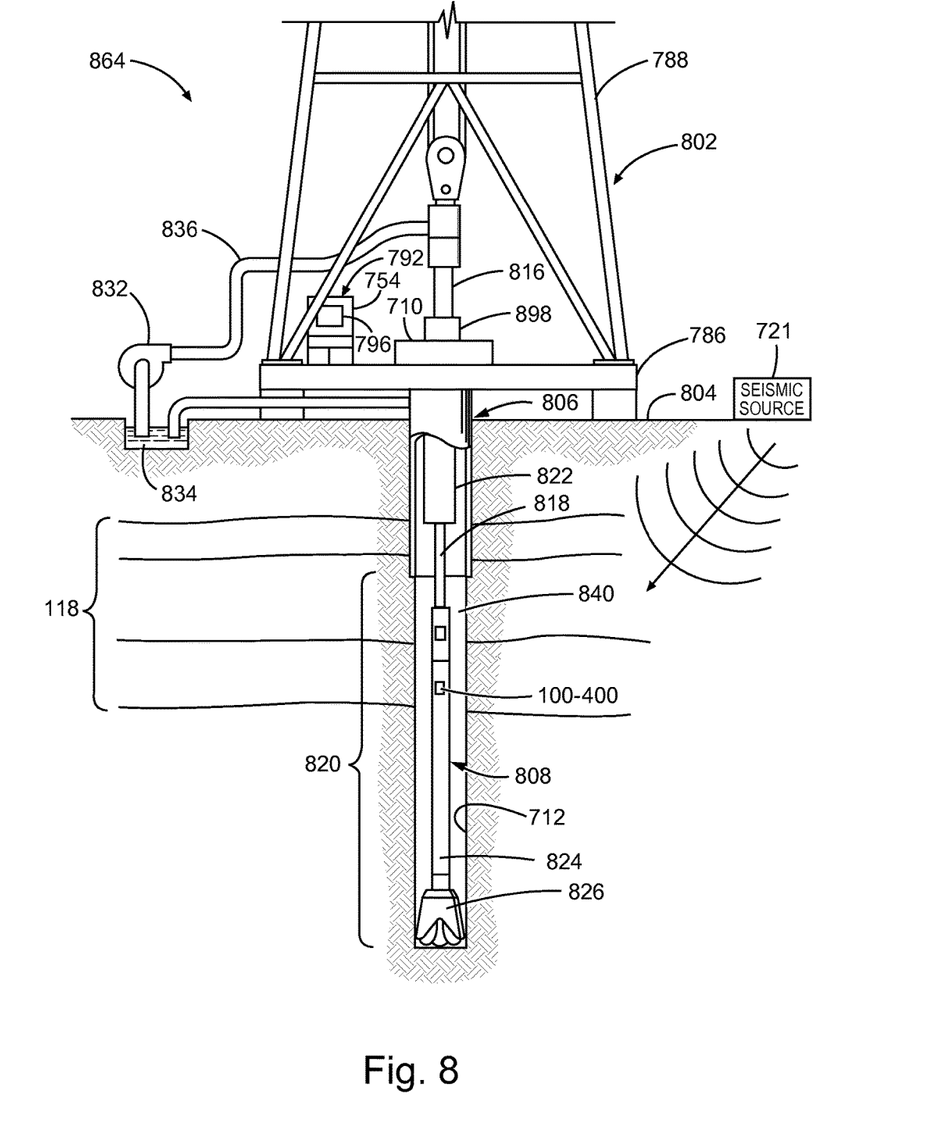
FIG. 8 is a diagram of a drilling rig system embodiment.

Seismic tools operate by having a seismic source 721 (e.g., low frequency, 1 to 300 Hz) on the surface, as shown in FIGS. 7 and 8, and the sensor in the tool. The AEM apparatus 300 uses the AEM sensor 320 as the seismic sensor. The AEM sensor 320 may detect relatively low frequency waves (e.g., 1-300 Hz) in response to received Doppler shifted EM signals.

The AEM apparatus 300 includes an electromagnetic source (e.g., EM emitter) 310 and an EM sensor 311 that may be located relatively close to the center of the AEM apparatus 300. The combination of the EM source 310 and the EM sensor 311 may be referred to as an AEM sensor 320. A seismic sensor 303 may be located on the AEM apparatus 300. While the seismic sensor 303 is shown at the top of the tool in FIG. 3, this is for purposes of illustration only as the sensor 303 may be located in other locations of the apparatus 300. The seismic sensor 303 may be considered an acoustic sensor since it is configured to receive low frequency sound waves from the seismic source 721.

In operation, the seismic source 721 (see FIG. 7) emits low frequency seismic energy into the formation 118. The EM source 310 of the AEM sensor 320 transmits EM waves 360, 361 into the formation 118. The EM waves 360, 361 may be reflected back by the seismic waves 340. The reflected EM waves 362, 363 are received by the EM sensor 311 of the AEM sensor 320. The Doppler shift of the received EM waves 362, 363 may be determined by circuitry (e.g., controller, processor) communicably coupled to the EM sensor 311. The circuitry can be disposed at the surface (e.g., see FIGS. 7 and 8) or can be located in the tool and the Doppler shift data transmitted as telemetry to the surface. The amount of Doppler shift may be representative of the velocity of the seismic waves 340 through the formation 118. This velocity may then be used in determining the properties of the formation 118 as discussed previously.

As a quality check operation, the seismic sensor 303 may also receive the seismic waves 340. A difference in time may be determined between the time the seismic waves 340 were transmitted by the seismic source 721 and the time the seismic waves 340 are received by the seismic sensor 303, after traveling through the formation 118. Since the distance between the seismic source 721 and the AEM apparatus 300 is known (e.g., length of cable, depth in borehole), the difference in time may be used to determine the velocity of the seismic waves 340 through the formation 118. The velocity determined by using the seismic sensor 303 may be compared to the velocity measured directly by the AEM sensor 320 to verify the accuracy of the AEM sensor measurement.

Figure 4:
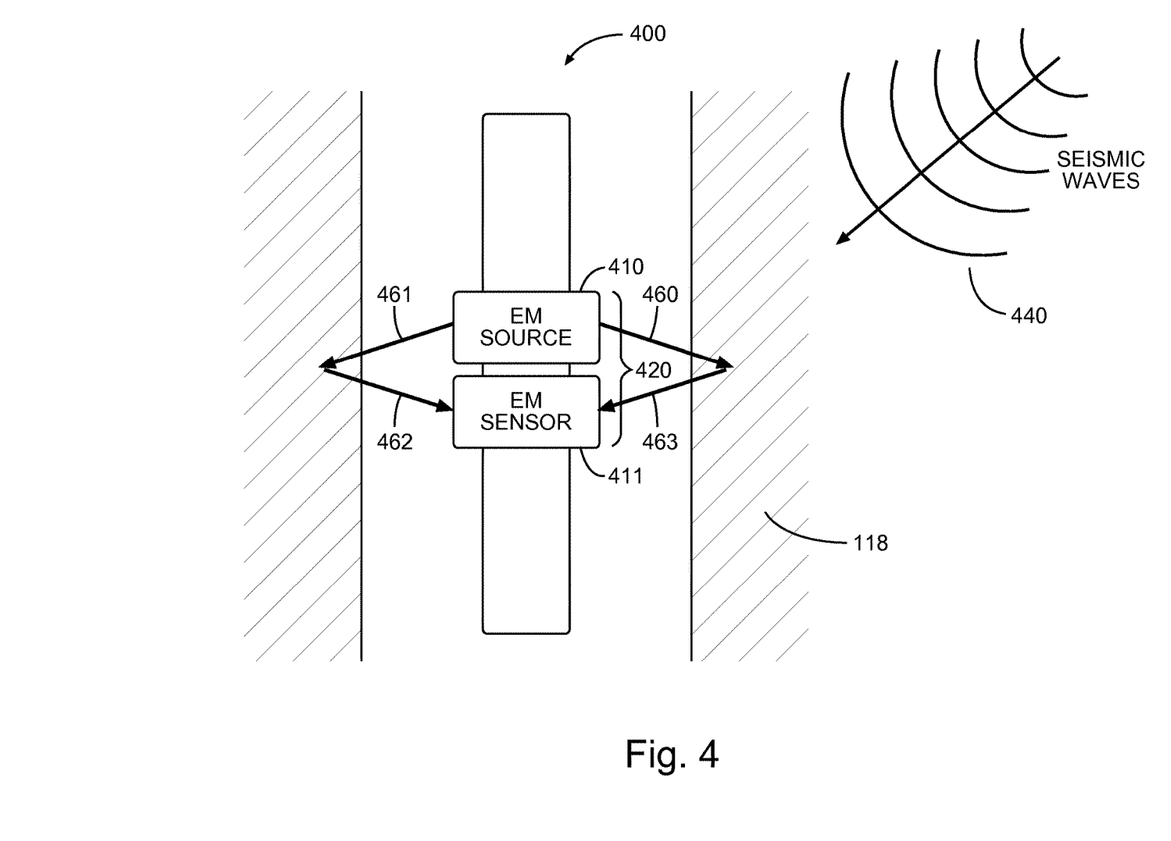
FIG. 4 is a block diagram showing another embodiment of an AEM apparatus used as a seismic tool.

FIG. 4 is a block diagram showing another embodiment of an AEM apparatus 400 used as a seismic tool. The AEM apparatus 400 of FIG. 4 is substantially similar to the AEM apparatus 300 of FIG. 3 but does not include the seismic sensor to perform the quality check operation.

The AEM apparatus 400 includes an electromagnetic source (e.g., EM emitter) 410 and an EM sensor 411 that may be located relatively close to the center of the AEM apparatus 400. The combination of the EM source 410 and the EM sensor 411 may be referred to as an AEM sensor 420.

In operation, the seismic source 721 (see FIGS. 7 and 8) emits low frequency seismic energy into the formation 118 where the borehole is located. The EM source 410 of the AEM sensor 420 transmits EM waves 460, 461 into the formation 118. The EM waves 460, 461 may be reflected back by the seismic waves 440. The reflected EM waves 462, 463 are received by the EM sensor 411 of the AEM sensor 420. The Doppler shift of the received EM waves 462, 463 may be determined by a circuitry (e.g., controller, processor) communicably coupled to the EM sensor 411. The circuitry can be disposed at the surface (e.g., see FIGS. 7 and 8) or can be located in the tool and the Doppler shift data transmitted as telemetry to the surface. The amount of Doppler shift may be representative of the velocity of the seismic waves 440 through the formation 118. This velocity may then be used in determining the properties of the formation as discussed previously.

Figure 5:
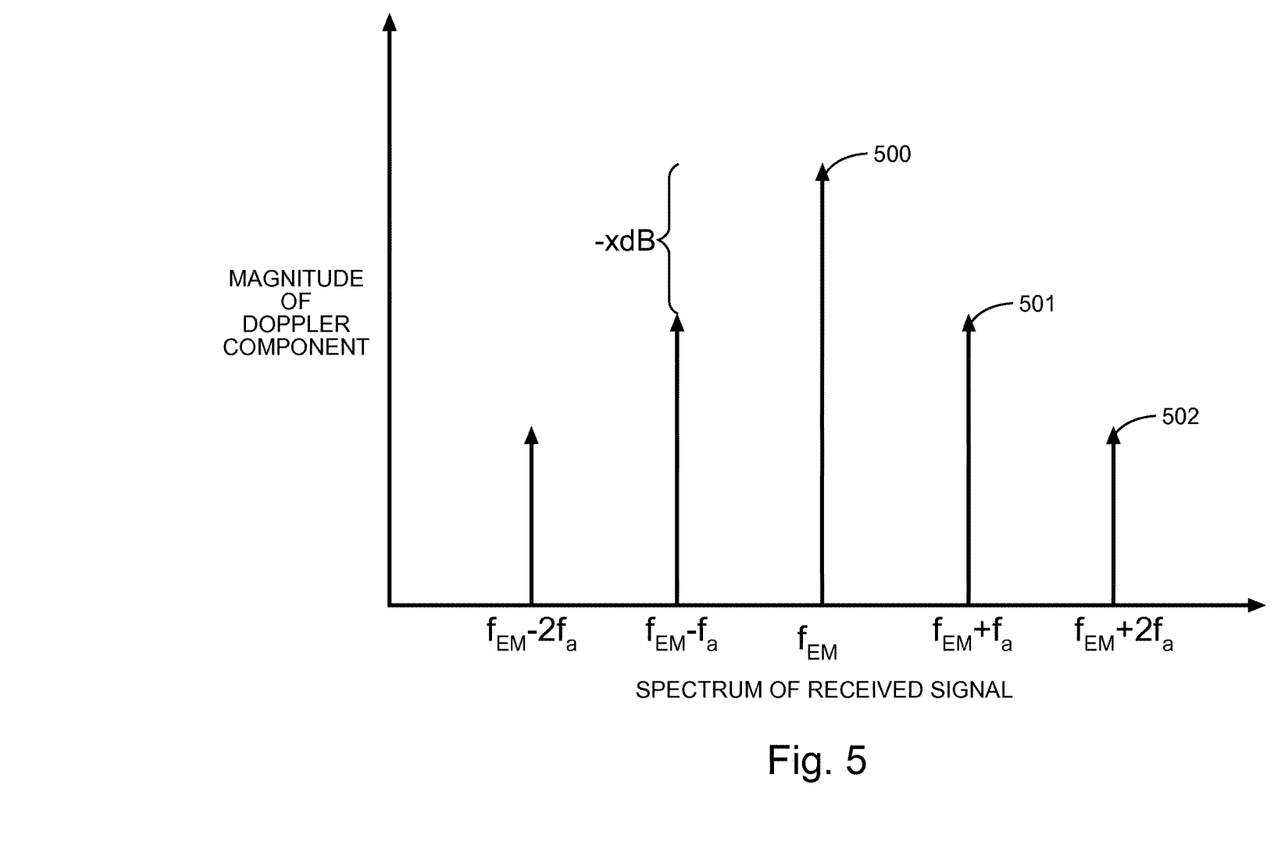
FIG. 5 is a plot showing results of a use of the acousto-electromagnetic apparatus of FIGS. 1-3.

FIG. 5 is a plot showing results of a use of the acousto-electromagnetic apparatus of FIGS. 1-4. This plot is for purposes of illustrating the concept of acoustic and electromagnetic wave interaction and does not limit the present embodiments. The x-axis of the plot is the relative frequency spectrum of a received signal. The y-axis of the plot is the relative magnitude of the Doppler components.

The plot of FIG. 5 assumes that an incident electromagnetic field having a frequency of $f_{EM}$ is transmitted through a geologic formation substantially simultaneously with an incident acoustic field having a frequency of $f_a$ being transmitted through the geologic formation. The interaction of the acoustic field with the formation or a fluid in the formation may result in a received signal having the Doppler shift components 501, 502 shown. A received unshifted component 500 is at frequency $f_{EM}$ while the first received Doppler component 501, at frequency $f_{EM}+f_a$, may have its amplitude attenuated by −X dB. The measured attenuation of the components 501, 502 at the different frequencies may be used to determine the geologic formation properties (e.g., elasticity, viscosity, density).

Figure 6:
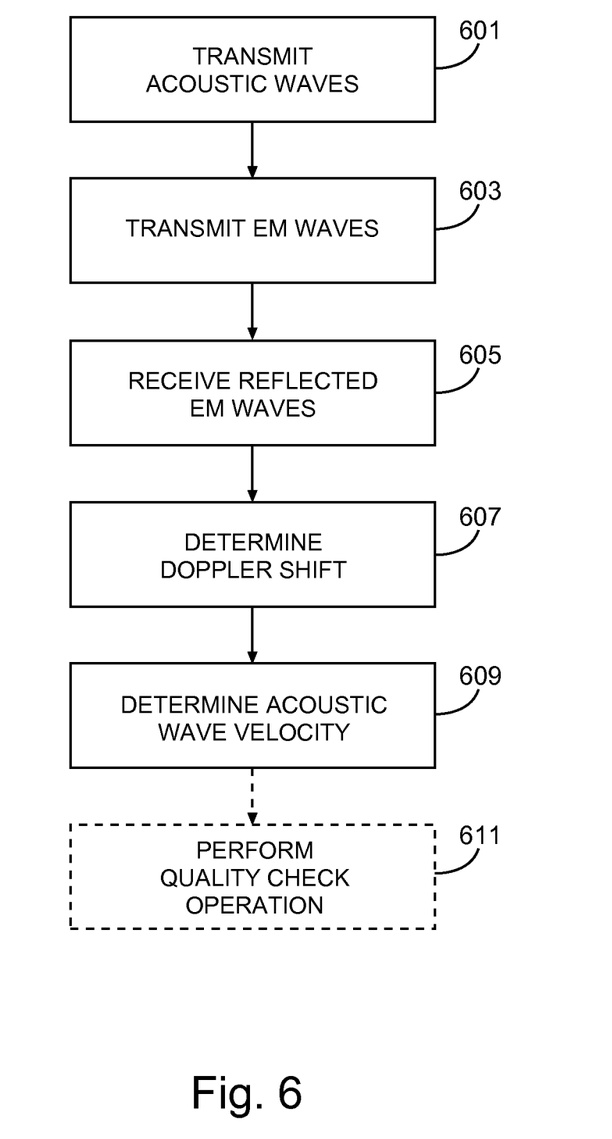
FIG. 6 is a flow chart showing an embodiment of a method for acoustic/seismic wave detection.

FIG. 6 is a flowchart showing an embodiment of a method for acoustic wave detection. The method transmits acoustic waves (e.g., seismic, sonic) into the formation in block 601. The AEM sensor transmits EM waves into the formation in block 603. The AEM sensor receives the reflected EM waves in block 605. A Doppler shift is determined from the received EM waves 607. The acoustic wave velocity is determined in response to the Doppler shift in block 609. The Doppler shift is representative of the acoustic wave velocity. The velocity is determined by a relationship between the ratio of source and measured frequency as a function of velocity change in the measured object ($f_{source}/f_{measured}$=change in velocity/speed of EM wave).

In an optional step, a quality check operation may be performed in block 611. This quality check operation may use acoustic sensors or seismic sensors on the AEM apparatus as discussed previously.

The above-described embodiments refer to acoustic waves. Acoustic waves may be defined as any sound waves of any frequency including sonic waves and seismic waves. Sonic waves are defined as having a higher frequency than the seismic waves.

FIG. 7 is a diagram showing a wireline system 764 and FIG. 8 is a diagram showing a drilling rig system 864 embodiment. The systems 764, 864 may thus comprise portions of a wireline logging tool body 770 as part of a wireline logging operation, or of a down hole tool 824 as part of a down hole drilling operation.

FIG. 7 illustrates a well used during wireline logging operations. In this case, a drilling platform 786 is equipped with a derrick 788 that supports a hoist 790.

Drilling oil and gas wells is commonly carried out using a string of drill pipes connected together so as to form a drillstring that is lowered through a rotary table 710 into a wellbore or borehole 712. Here it is assumed that the drillstring has been temporarily removed from the borehole 712 to allow a wireline logging tool body 770, such as a probe or sonde, to be lowered by wireline or logging cable 774 (e.g., slickline cable) into the borehole 712. Typically, the wireline logging tool body 770 is lowered to the bottom of the region of interest and subsequently pulled upward at a substantially constant speed. The tool body 770 may include the AEM apparatus 100-400 as seen previously in FIGS. 1-4.

During the upward trip, at a series of depths various instruments (e.g., the AEM apparatus 100-400 included in the tool body 770) may be used to perform measurements on the subsurface geological formations 118 adjacent to the borehole 712 (and the tool body 770). The measurement data can be communicated to a surface logging facility 792 for processing, analysis, and/or storage. The processing and analysis may include measurement of Doppler shift and determination of acoustic/seismic wave velocity. The logging facility 792 may be provided with electronic equipment for various types of signal processing, which may be used by any one or more of the components of the AEM apparatus 100-400. Similar formation evaluation data may be gathered and analyzed during drilling operations (e.g., during LWD/MWD operations, and by extension, sampling while drilling).

In some embodiments, the tool body 770 is suspended in the wellbore by a wireline cable 774 that connects the tool to a surface control unit (e.g., comprising a workstation 754). The tool may be deployed in the borehole 712 on coiled tubing, jointed drill pipe, hard wired drill pipe, or any other suitable deployment technique.

A seismic source 721 is located on the surface. The seismic source 721 may be configured to transmit seismic waves into the geologic formation. The workstation 754 may include a controller 796 that controls operation of the seismic source 721. The seismic source 721 may be considered an acoustic source as well since it generates low frequency sound waves.

Referring to FIG. 8, it can be seen how a system 864 may also form a portion of a drilling rig 802 located at the surface 804 of a well 806. The drilling rig 802 may provide support for a drillstring 808. The drillstring 808 may operate to penetrate the rotary table 710 for drilling the borehole 712 through the subsurface formations 118. The drillstring 808 may include a Kelly 816, drill pipe 818, and a bottom hole assembly 820, perhaps located at the lower portion of the drill pipe 818. As can be seen in the figure, the drillstring may include the AEM apparatus 100-400 as shown above in FIGS. 1-4.

The bottom hole assembly 820 may include drill collars 822, a down hole tool 824, and a drill bit 826. The drill bit 826 may operate to create the borehole 712 by penetrating the surface 804 and the subsurface formations 118. The down hole tool 824 may comprise any of a number of different types of tools including MWD tools, LWD tools, and others.

During drilling operations, the drillstring 808 (perhaps including the Kelly 816, the drill pipe 818, and the bottom hole assembly 820) may be rotated by the rotary table 710. Although not shown, in addition to, or alternatively, the bottom hole assembly 820 may also be rotated by a motor (e.g., a mud motor) that is located down hole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 118.

During drilling operations, a mud pump 832 may pump drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 712. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation cuttings created by operating the drill bit 826.

The workstation 754 and the controller 796 may include modules comprising hardware circuitry, a processor, and/or memory circuits that may store software program modules and objects, and/or firmware, and combinations thereof, as desired by the architect of the AEM apparatus 100-400 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

Figure 9:
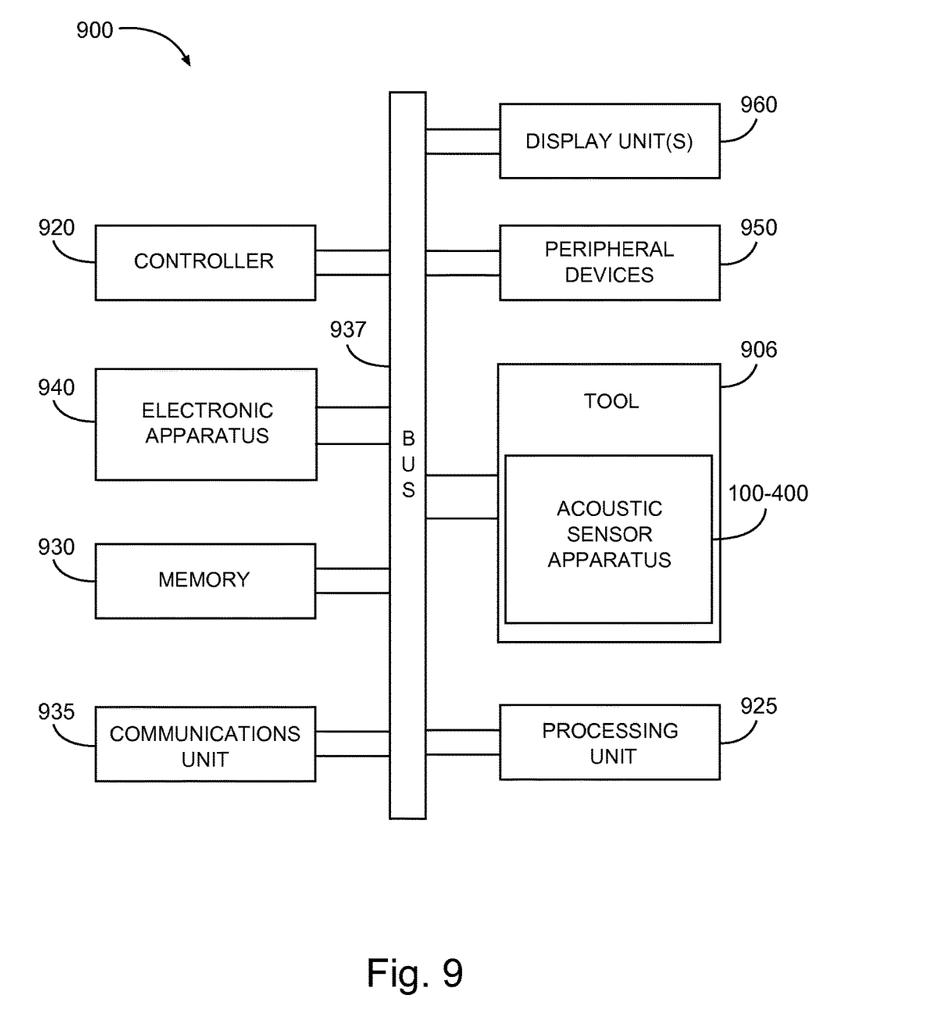
FIG. 9 is a block diagram of an example system operable to execute the method of FIG. 6.

FIG. 9 is a block diagram of an example system 900 operable to execute the method of FIG. 6. The system 900 may include a tool housing 906 with an acoustic sensor apparatus 100-400 as illustrated in any one of FIGS. 1-4. The system 900 may be configured to operate in accordance with the teachings herein for acoustic wave detection and determination of a velocity of the acoustic wave.

The system 900 may include circuitry (e.g., a controller) 920, a memory 930, an electronic apparatus 940, and a communications unit 935. The memory 930 can be structured to include a database. The controller 920, the memory 930, and the communications unit 935 can be arranged to operate as a processing unit to control operation of the tool 906 and execute steps to perform the method of FIG. 9. A processing unit 925, structured to conduct such evaluation using neutron-neutron measurements, can be implemented as a single unit or distributed among the components of the system 900 including electronic apparatus 940. The electronic apparatus 940 can provide other circuitry for operation of the system 900. The controller 920 and the memory 930 can operate to control activation of the neutron source(s) in the device 100 to generate neutron pulses. The controller 920 and the memory 930 can operate to control selection of the detector(s) in the device 100 and to manage processing schemes. The controller 920, the memory 930, and other components of the system 900 can be configured, for example, to operate similar to or identical to the components discussed herein or similar to or identical to any of methods discussed herein.

The communications unit 935 can include downhole communications for appropriately located sensors in a wellbore. Such downhole communications can include a telemetry system. The communications unit 935 may use combinations of wired communication technologies and wireless technologies at frequencies that do not interfere with ongoing measurements.

The system 900 can also include a bus 937, where the bus 937 provides electrical conductivity among the components of the system 900. The bus 937 can include an address bus, a data bus, and a control bus, each independently configured or in an integrated format. The bus 937 can be realized using a number of different communication mediums that allows for the distribution of components of the system 900. The bus 937 can include a network. Use of the bus 937 can be regulated by the controller 920.

In various embodiments, the peripheral devices 950 can include additional storage memory and other control devices that may operate in conjunction with the controller 920 and the memory 930. In an embodiment, the controller 920 can be realized as a processor or a group of processors that may operate independently depending on an assigned function.

The system 900 can include display unit(s) 960 as a distributed component on the surface of a wellbore, which can be used with instructions stored in the memory 930 to implement a user interface to monitor the operation of the tool 906 or components distributed within the system 900. The user interface may be used to input parameter values for thresholds such that the system 900 can operate autonomously, without user intervention in a variety of applications. The user interface can also provide for manual override and change of control of the system 900 to a user. Such a user interface can be operated in conjunction with the communications unit 935 and the bus 937. Many embodiments may thus be realized, and the elements of several will now be listed in detail.

EXAMPLES

Example 1 is an acousto-electromagnetic (AEM) apparatus comprising: an AEM sensor, including an electromagnetic source and an electromagnetic sensor, configured to transmit an electromagnetic wave into a geologic formation and receive a reflected electromagnetic wave; and circuitry coupled to the AEM sensor and configured to determine a velocity of an acoustic wave through the geologic formation based on a Doppler shift effect indicated by the reflected electromagnetic wave as compared to the transmitted electromagnetic wave.

In Example 2, the subject matter of Example 1 can further include an acoustic source configured to generate the acoustic wave through the geologic formation.

In Example 3, the subject matter of Examples 1-2 can further include an acoustic sensor configured to receive the acoustic wave from the geologic formation, the acoustic sensor located on the AEM apparatus a fixed distance from the acoustic source.

In Example 4, the subject matter of Examples 1-3 can further include: a pair of acoustic sources, each acoustic source located a fixed distance apart from the other acoustic source; and a pair of acoustic sensors, each acoustic sensor co-locate with an acoustic source of the pair of acoustic sources.

In Example 5, the subject matter of Examples 1-4 can further include a seismic sensor configured to receive the acoustic wave through the geologic formation.

In Example 6, the subject matter of Examples 1-5 can further include wherein the acoustic source is a first acoustic source and further comprising a second acoustic source located on the AEM apparatus a fixed distance from the first acoustic source.

In Example 7, the subject matter of Examples 1-6 can further include: a first acoustic sensor co-located with the second acoustic source and configured to receive the acoustic wave, generated by the first acoustic source, from the geologic formation; and a second acoustic sensor co-located with the first acoustic source and configured to receive an acoustic wave, generated by the second acoustic source, from the geologic formation.

Example 8 is a method for acoustic wave detection, the method comprising: transmitting an electromagnetic wave through a geologic formation;

receiving a reflected electromagnetic wave from the geologic formation; and determining a velocity of an acoustic wave through the geologic formation in response to a Doppler shift effect indicated by the reflected electromagnetic as compared to the transmitted electromagnetic wave.

In Example 9, the subject matter of Example 9 can further include performing a quality check of the velocity of the acoustic wave.

In Example 10, the subject matter of Examples 8-9 can further include wherein the quality check comprises determining a time difference between transmission of a seismic wave through the geologic formation and receipt of the seismic wave after traveling through the geologic formation.

In Example 11, the subject matter of Examples 8-10 can further include wherein the quality check comprises determining a time difference between transmission of a sonic wave through the geologic formation and receipt of the sonic wave after traveling through the geologic formation.

In Example 12, the subject matter of Examples 8-11 can further include transmitting the sonic wave from a sonic source disposed on an acousto-electromagnetic (AEM) apparatus and receiving the sonic wave by a sonic sensor disposed on the AEM apparatus.

In Example 13, the subject matter of Examples 8-12 can further include wherein the sonic source is a first sonic source transmitting a first sonic wave and the sonic sensor is a first sonic sensor receiving the first sonic wave, the method further comprising a second sonic source co-located on the AEM apparatus with the first sonic sensor and transmitting a second sonic wave and a second sonic sensor co-located on the AEM apparatus with the first sonic source and receiving the second sonic wave.

In Example 14, the subject matter of Examples 8-13 can further include wherein the acoustic wave is one of a seismic wave or a sonic wave.

In Example 15, the subject matter of Examples 8-14 can further include transmitting the seismic wave from a surface of the geologic formation.

In Example 16, the subject matter of Examples 8-15 can further include transmitting the sonic wave from Example 17 is a system comprising: a down hole tool comprising an acousto-electromagnetic (AEM) apparatus, the AEM apparatus comprising: an EM source configured to transmit an electromagnetic wave through a geologic formation; and an EM sensor configured to receive a reflected electromagnetic wave from the geologic formation; and circuitry communicably coupled to the AEM apparatus and configured to determine a velocity of an acoustic wave through the geologic formation based on the reflected electromagnetic as compared to the transmitted electromagnetic wave.

In Example 18, the subject matter of Example 17 can further include wherein the down hole tool is a wireline tool.

In Example 19, the subject matter of Examples 17-18 can further include wherein the down hole tool is a drill string tool.

In Example 20, the subject matter of Examples 17-19 can further wherein the circuitry is programmed with instructions to determine the velocity in response to a Doppler shift effect indicated by the reflected electromagnetic wave.

In Example 21, the subject matter of Examples 17-20 can further wherein the down hole tool is a hybrid tool that is configured to act as a sonic tool during drilling and a seismic tool when drilling is halted.

In Example 22, the subject matter of Examples 17-21 can further wherein the AEM apparatus is part of an acoustic tool.

In Example 23, the subject matter of Examples 17-22 can further wherein the AEM apparatus is part of a seismic tool.

In Example 24, the subject matter of Examples 17-23 can further wherein the circuitry is coupled to the AEM apparatus through a telemetry connection.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An acousto-electromagnetic (AEM) apparatus comprising:
    an electromagnetic source attached to a tool body in a borehole of a geologic formation, the electromagnetic source to transmit an initial electromagnetic wave into the geologic formation;
    an electromagnetic sensor to receive a reflected electromagnetic wave from the geologic formation;
    a first acoustic sensor;
    a processor communicably coupled to the electromagnetic sensor and the first acoustic sensor; and
    a non-transitory memory coupled to the processor, the non-transitory memory having instructions executable by the processor to,
        determine, using data from the electromagnetic sensor, a first velocity of an acoustic wave generated at a first acoustic source through the geologic formation based on a Doppler shift effect indicated by the reflected electromagnetic wave as compared to the initial electromagnetic wave,
        determine a second velocity of the acoustic wave based on receipt of the acoustic wave at the first acoustic sensor, and
        determine an accuracy of the first velocity in accordance with a comparison of the first velocity to the second velocity.

2. The apparatus of claim 1, wherein the first acoustic source is located on the tool body.

3. The apparatus of claim 1, wherein the first acoustic sensor is located on the tool body a fixed distance from the first acoustic source.

4. The apparatus of claim 1, wherein the first acoustic source is attached to the tool body, the apparatus further comprising:
    a second acoustic source attached to the tool body, the second acoustic source located a fixed distance apart from the first acoustic source; and
    a second acoustic sensor, the first acoustic sensor and the second acoustic sensor co-located with the first acoustic source and the second acoustic source respectively.

5. The apparatus of claim 1, wherein the first acoustic sensor comprises a seismic sensor attached to the tool body, wherein the seismic sensor receives the acoustic wave through the geologic formation.

6. The apparatus of claim 1, wherein the first acoustic source is attached to the tool body, and further comprising a second acoustic source located on the tool body a fixed distance from the first acoustic source.

7. The apparatus of claim 1, wherein determining the first velocity of the acoustic wave comprises determining at least one of a time difference between the reflected electromagnetic wave and the initial electromagnetic wave or a frequency ratio of the reflected electromagnetic wave and the initial electromagnetic wave.

8. A method for acoustic wave detection, the method comprising:
    transmitting an acoustic wave through a geologic formation;
    transmitting an initial electromagnetic wave through the geologic formation from a tool in a borehole;
    receiving a reflected electromagnetic wave from the geologic formation;

determining a first velocity of the acoustic wave through the geologic formation in response to a Doppler shift effect indicated by the reflected electromagnetic wave as compared to the initial electromagnetic wave;

determining a second velocity of the acoustic wave based on receipt of the acoustic wave at an acoustic sensor; and determining an accuracy of the first velocity in accordance with a comparison of the first velocity to the second velocity.

9. The method of claim 8, wherein the acoustic wave is transmitted from a first acoustic source attached to the tool, the method further comprising transmitting a second acoustic wave from a second acoustic source attached to the tool substantially simultaneously with the transmission of the acoustic wave.

10. the method of claim 8, wherein determining the second velocity of the acoustic wave comprises determining a time difference between transmission of the acoustic wave through the geologic formation and receipt of the acoustic wave after traveling through the geologic formation.

11. The method of claim 8, wherein the acoustic sensor is disposed on the tool, and wherein transmitting the acoustic wave comprises transmitting the acoustic wave from an acoustic source disposed on the tool and receiving the acoustic wave by the acoustic sensor.

12. The method of claim 11, wherein the acoustic source comprises a first sonic source and the acoustic wave comprises a first sonic wave and wherein the acoustic sensor is a first sonic sensor receiving the first sonic wave, the method further comprising transmitting a second sonic wave from a second sonic source co-located on the tool with the first sonic sensor and receiving the second sonic wave at a second sonic sensor co-located on the tool with the first sonic source.

13. The method of claim 8, wherein the acoustic wave is one of a seismic wave or a sonic wave.

14. The method of claim 8, wherein transmitting the acoustic wave comprises transmitting the acoustic wave from a seismic source on a surface of the geologic formation.

15. The method of claim 8, wherein the acoustic sensor comprises a seismic sensor attached to the tool.

16. A system comprising:
a seismic source outside of a borehole of a geologic formation;
a processor; and
a down hole tool in the borehole, the down hole tool comprising an acousto-electromagnetic (AEM) apparatus, the AEM apparatus comprising
an electromagnetic source to transmit an initial electromagnetic wave through the geologic formation,
an electromagnetic sensor to receive a reflected electromagnetic wave from the geologic formation,
an acoustic sensor, and
circuitry communicably coupled to the AEM apparatus, the seismic source, and a non-transitory memory, the non-transitory memory having instructions executable by the processor to
determine, using data from the electromagnetic sensor, a first velocity of the an acoustic wave generated at a first acoustic source through the geologic formation based on the reflected electromagnetic wave as compared to the initial electromagnetic wave,
determine a second velocity of the acoustic wave based on receipt of the acoustic wave at the acoustic sensor, and
determine an accuracy of the first velocity in accordance with a comparison of the first velocity to the second velocity.

17. The system of claim 16, wherein the down hole tool is a wireline tool.

18. The system of claim 16, wherein the down hole tool is a drill string tool.

19. The system of claim 16, wherein the instructions executable by the processor further comprises instructions to determine the first velocity in response to a Doppler shift effect indicated by the reflected electromagnetic wave.

20. The system of claim 16, wherein the down hole tool is a hybrid tool that acts as a sonic tool during drilling and a seismic tool when drilling is halted.

21. The system of claim 16, wherein the AEM apparatus is part of an acoustic tool.

22. The system of claim 16, wherein the AEM apparatus is part of a seismic tool.

23. The system of claim 16, wherein the circuitry is coupled to the AEM apparatus through a telemetry connection.

* * * * *